US009129634B1

(12) United States Patent
Boone, Jr. et al.

(10) Patent No.: US 9,129,634 B1
(45) Date of Patent: Sep. 8, 2015

(54) INTEGRATED COMPOUND DBR LASER FOR HAMR APPLICATIONS

(71) Applicant: HGST Netherlands B.V., Amsterdam (NL)

(72) Inventors: Thomas Dudley Boone, Jr., San Jose, CA (US); Juraj Topolancik, San Jose, CA (US)

(73) Assignee: HGST NETHERLANDS B.V., Amsterdam (NL)

(*) Notice: Subject to any disclaimer, the term of this patent is extended or adjusted under 35 U.S.C. 154(b) by 0 days.

(21) Appl. No.: 14/307,451

(22) Filed: Jun. 17, 2014

(51) Int. Cl.
*G11B 5/127* (2006.01)
*G11B 5/60* (2006.01)
*G11B 5/00* (2006.01)

(52) U.S. Cl.
CPC ...... *G11B 5/6088* (2013.01); *G11B 2005/0021* (2013.01)

(58) Field of Classification Search
CPC ........... G11B 2005/0021; G11B 5/314; G11B 5/6088; G11B 7/1387; G11B 2005/001; G11B 5/3103; G11B 11/10536
USPC ............. 369/300, 13.01, 13.02, 13.13, 13.24, 369/13.32, 13.33; 360/110, 125.3, 128, 59, 360/125.31
See application file for complete search history.

(56) References Cited

U.S. PATENT DOCUMENTS

| 6,044,056 A * | 3/2000 | Wilde et al. ................... 369/119 |
| 6,392,979 B1 * | 5/2002 | Yamamoto et al. ........... 369/121 |
| 6,778,582 B1 | 8/2004 | Mooradian |
| 6,963,530 B1 * | 11/2005 | Thornton et al. ............. 369/121 |
| 7,057,999 B2 * | 6/2006 | Cheong et al. ................ 369/121 |
| 7,289,422 B2 * | 10/2007 | Rettner et al. ................ 369/300 |
| 7,327,667 B2 * | 2/2008 | Thornton et al. ............. 369/300 |
| 7,864,635 B2 * | 1/2011 | Shimizu ..................... 369/13.02 |
| 8,116,171 B1 | 2/2012 | Lee |
| 8,125,856 B1 * | 2/2012 | Li et al. ....................... 369/13.01 |
| 8,184,507 B1 * | 5/2012 | Hirano et al. ............. 369/13.33 |
| 8,274,867 B2 | 9/2012 | Mori et al. |
| 8,325,569 B1 * | 12/2012 | Shi et al. .................... 369/13.33 |
| 8,422,342 B1 * | 4/2013 | Lee ............................ 369/13.33 |
| 8,451,695 B2 | 5/2013 | Olson |
| 8,451,707 B1 | 5/2013 | Stipe |
| 8,456,964 B1 * | 6/2013 | Yuan et al. ................. 369/13.33 |
| 8,477,571 B1 * | 7/2013 | Zhou et al. ................. 369/13.33 |
| 8,501,536 B2 | 8/2013 | Mooney et al. |
| 8,547,804 B2 * | 10/2013 | Shimizu .................... 369/13.32 |
| 8,599,657 B1 * | 12/2013 | Lee ............................ 369/13.33 |
| 8,787,130 B1 * | 7/2014 | Yuan et al. ................. 369/13.33 |

(Continued)

OTHER PUBLICATIONS

Buet, X et al. "Wavelength-Stabilised External-Cavity Laser Diode Using Cavity Resonator Integrated Guided Mode Filter"; Electronic Letters; vol. 48, Issue 25; Dec. 2010.

(Continued)

*Primary Examiner* — Will J Klimowicz
(74) *Attorney, Agent, or Firm* — Patterson & Sheridan, LLP

(57) ABSTRACT

Embodiments disclosed herein generally relate to a magnetic write head including a media facing surface and a surface opposite the media facing surface. The magnetic write head further includes a reflector extending from the surface opposite the media facing surface toward the media facing surface. A semiconductor laser diode gain region protrudes out of the surface opposite the media facing surface, and the reflector helps optimizing the optical energy generated in the semiconductor laser diode gain region to be a single mode over a large current and temperature range.

8 Claims, 7 Drawing Sheets

(56) References Cited

U.S. PATENT DOCUMENTS

| | | | |
|---|---|---|---|
| 8,824,247 B2* | 9/2014 | Hurley et al. | 369/13.02 |
| 8,842,506 B1* | 9/2014 | Matsumoto et al. | 369/13.33 |
| 8,861,317 B1* | 10/2014 | Yan et al. | 369/13.33 |
| 8,873,353 B1* | 10/2014 | Riddering | 369/13.33 |
| 8,873,354 B2* | 10/2014 | Jin et al. | 369/13.33 |
| 8,885,280 B1* | 11/2014 | Huang et al. | 360/59 |
| 8,885,449 B2* | 11/2014 | Jin et al. | 369/13.33 |
| 8,891,341 B1* | 11/2014 | Krichevsky et al. | 369/13.33 |
| 8,897,102 B1* | 11/2014 | Lin et al. | 369/13.12 |
| 8,902,720 B1* | 12/2014 | Schreck et al. | 369/13.33 |
| 8,908,480 B1* | 12/2014 | Krichevsky | 369/13.13 |
| 2004/0202054 A1* | 10/2004 | Hesselink et al. | 369/13.02 |
| 2006/0075417 A1* | 4/2006 | Miyanishi et al. | 720/658 |
| 2010/0128576 A1* | 5/2010 | Fang et al. | 369/13.24 |
| 2010/0165801 A1* | 7/2010 | Boone et al. | 369/13.11 |
| 2012/0182842 A1* | 7/2012 | Iwanabe et al. | 369/13.17 |
| 2012/0201491 A1 | 8/2012 | Zhou | |
| 2012/0327754 A1* | 12/2012 | Olson | 369/47.15 |
| 2014/0209664 A1* | 7/2014 | Takayama et al. | 228/104 |
| 2014/0241137 A1* | 8/2014 | Jin et al. | 369/13.14 |
| 2014/0254335 A1* | 9/2014 | Gage et al. | 369/13.33 |
| 2014/0269236 A1* | 9/2014 | Kozlovsky et al. | 369/13.24 |
| 2014/0313872 A1* | 10/2014 | Rawat et al. | 369/13.33 |
| 2014/0355401 A1* | 12/2014 | Huang et al. | 369/13.29 |

OTHER PUBLICATIONS

Kintaka, K. et al."Cavity-Resonator-Integrated Guided-Mode Resonance Filter for Aperture Miniaturization"; Optics Express 1444; vol. 20, No. 2; Jan. 2012.

* cited by examiner

INTEGRATED COMPOUND DBR LASER FOR HAMR APPLICATIONS

BACKGROUND

1. Field

Embodiments disclosed herein generally relate to data storage systems, and more particularly, to heat-assisted magnetic recording (HAMR) system.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

Typically, the laser beam used to heat the media surface is generated from Fabry Perot (FP) laser diodes, but the FP laser diodes suffer from mode hopping which leads to significant power fluctuations, such as power fluctuations greater than two percent. High frequency pulsing of the laser diode can reduce the impact of mode hopping by forcing the device to operate multimode. However, the quality of the magnetic recording is degraded by using the high frequency pulsing of the laser diode.

Therefore, an improved HAMR system is needed.

SUMMARY

Embodiments disclosed herein generally relate to a magnetic write head including a media facing surface and a surface opposite the media facing surface. The magnetic write head further includes a reflector extending from the surface opposite the media facing surface toward the media facing surface. A semiconductor laser diode gain region protrudes out of the surface opposite the media facing surface, and the reflector optimizes the optical energy generated in the semiconductor laser diode gain region to be a single lasing optical mode over a large current and temperature range.

In one embodiment, a magnetic write head is disclosed. The magnetic write head includes a media facing surface, a surface opposite the media facing surface, a semiconductor laser diode gain region protruding out of the surface opposite the media facing surface, and a reflector extending from the surface opposite the media facing surface toward the media facing surface. The semiconductor laser diode gain region is aligned with the reflector.

In another embodiment, a magnetic write head is disclosed. The magnetic write head includes a media facing surface, a surface opposite the media facing surface, a near field transducer disposed proximate the media facing surface, a semiconductor laser diode gain region disposed between the near field transducer and the surface opposite the media facing surface, and a reflector disposed between the near field transducer and the semiconductor laser diode gain region. The semiconductor laser diode gain region is aligned with the reflector.

In another embodiment, a magnetic write head is disclosed. The magnetic write head includes a media facing surface, a surface opposite the media facing surface, an optical light generating device disposed over the surface, a spot size converter extending from the structure to the media facing surface, and a guided mode resonance structure coupled to the spot size converter. The guide mode resonance structure has a single mode planar waveguide that is oriented in a direction that is substantially parallel to the media facing surface and the direction is a cross-track direction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a magnetic write head including a media facing surface and a surface opposite the media facing surface. The magnetic write head further includes a reflector extending from the surface opposite the media facing surface toward the media facing surface. A semiconductor laser diode gain region protrudes out of the surface opposite the media facing surface, and the reflector helps optimizing the optical energy generated in the semiconductor laser diode gain region to be a single mode over a large current and temperature range.

Figure 1:
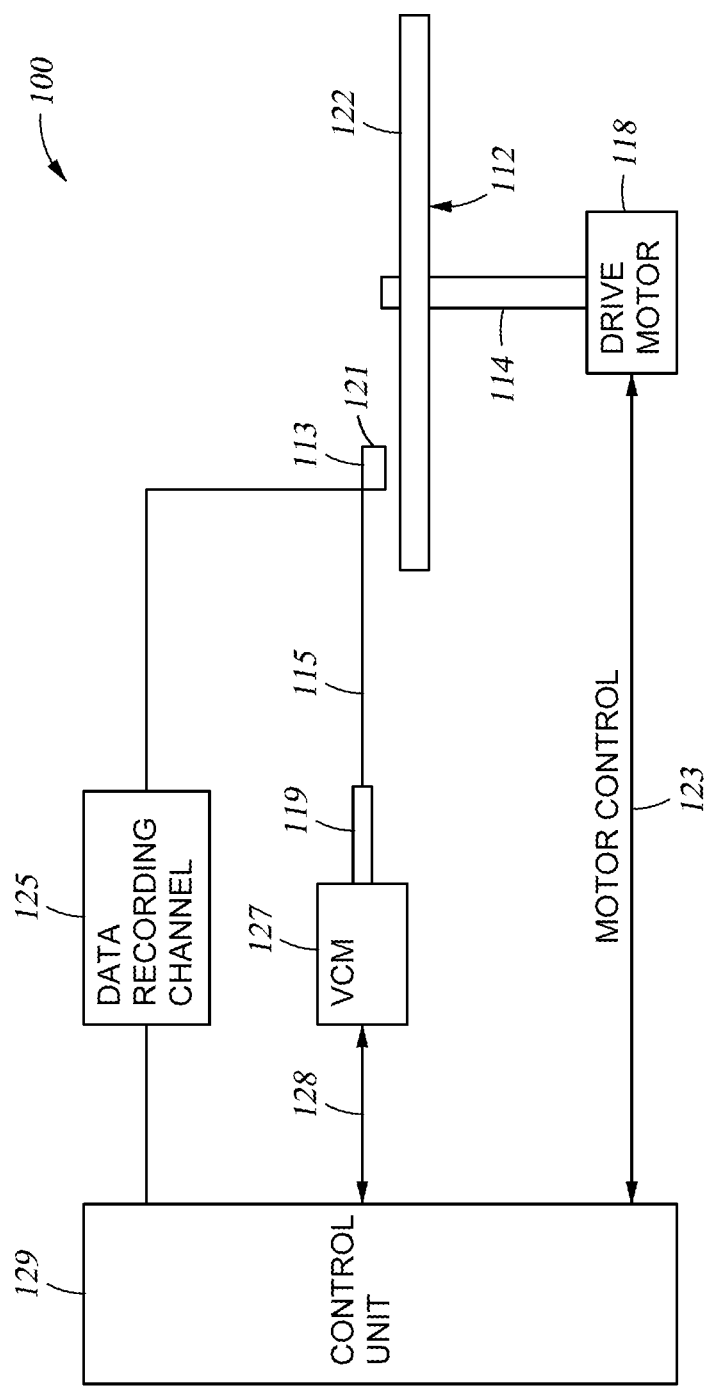
FIG. 1 illustrates a disk drive system, according to embodiments of the described herein.

FIG. 1 illustrates a disk drive 100 according to one embodiment disclosed herein. As shown, at least one rotatable magnetic media 112 is supported on a spindle 114 and rotated by a disk drive motor 118. The magnetic recording on each disk is in the form of annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser and/or electrically resistive heater) for heating the disk surface 122. As the magnetic disk rotates, the slider 113 moves radially in and out over the disk surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic media 112 generates an air bearing between the slider 113 and the disk surface 122 which exerts an upward force or lift on the slider 113. The air bearing thus counter-balances the slight spring force of suspension 115 and supports slider 113 off and slightly above the media 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
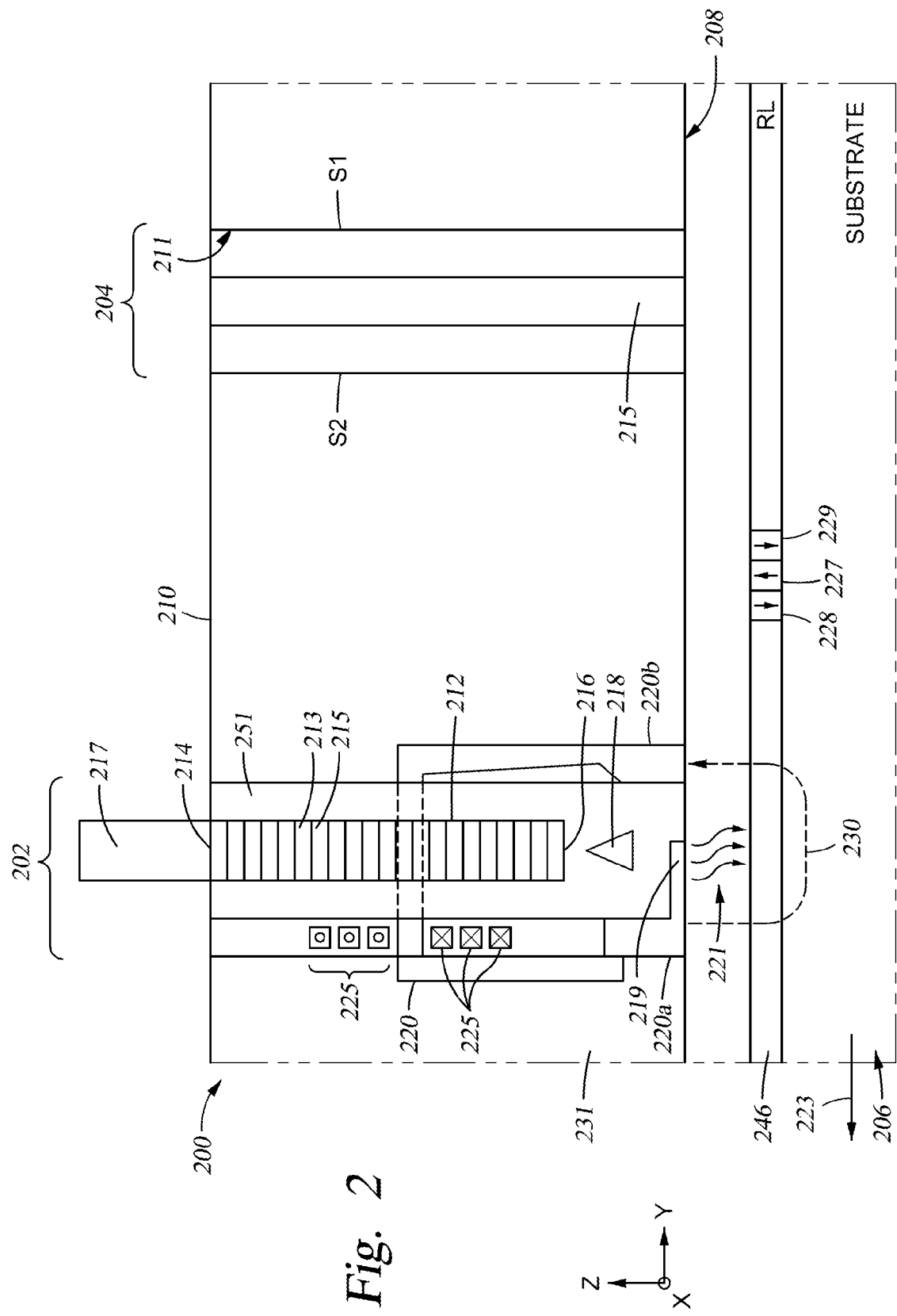
FIG. 2 illustrates a HAMR system according to one embodiment described herein.

FIG. 2 is a cross sectional schematic of a HAMR system 200, according to one embodiment of the invention. The HAMR system 200 includes a magnetic write head 202, a magnetic read head 204 and a magnetic media 206, such as a disk. The magnetic media 206 includes a substrate and a perpendicular magnetic recording layer (RL) 246. In one embodiment, the magnetic media 206 may include an optional "soft" or relatively low-coercivity magnetically permeable underlayer (SUL). However, the SUL is not required for a HAMR system 200.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk may also include a protective overcoat (not shown) over the RL 246.

The HAMR system 200 has a substrate trailing surface 211 and a media facing surface (MFS) 208 oriented generally perpendicular to trailing surface 211. The HAMR system 200 also includes a surface 210 opposite the MFS 208. The trailing surface 211 is typically formed of a composite material, such as a composite of alumina/titanium-carbide ($Al_2O_3$/TiC), and supports the read head 204 and the write head 202, which are typically formed as a series of thin films and structures on the trailing surface 211. The magnetic media 206 may spin in a direction 223 away from the trailing surface 211 and towards the other layers of the HAMR system 200. The MFS 208 is the recording-layer-facing surface of the slider that faces the media 206. Note that FIG. 2 is not drawn to scale because of the difficulty in showing the very small features and, for the sake of clarity, omits structures from the head such as spacing and insulating layers.

The magnetic read head 204 includes a magnetoresistive read pole 215 located between shields S1 and S2. The magnetic write head 202 includes a magnetic yoke 220 with a write pole 220a, a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, embodiments may operate with any recording head that can perform the functions discussed herein.

The magnetic head 202 may also include a non-magnetic material 251 between the return pole 220b and the write pole 220a. The non-magnetic material 251 may include $SiO_2$ and $Al_2O_3$. A reflector 212 is embedded in the non-magnetic material 251. The reflector 212 has a first end 214 extending to the surface 210 and a second end 216 proximate a spot size converter (SSC) 218. The reflector 212 may be a spatial periodic structure that includes a plurality of alternating layers 213, 215, and the alternating layers 213, 215 have different indices of refraction. One of the two layers 213, 215 may be made of III-V semiconductor materials, such as AlGaAs or GaAs, and the other layer of the two layers 213, 215 may be made of a material having a lower refractive index than III-V semiconductor materials. Examples of the material may include tantalum oxide, tantalum nitride, silicon nitride, silicon dioxide, and the like. In one embodiment, the reflector 212 is a distributed Bragg reflector (DBR). The reflector 212 may extend through the yoke 220 and may be located between the write pole 220a and the return pole 220b. As noted by the ghosted lines, the yoke 220 may continuously connect the write pole 220a to the return pole 220b.

Figure 3A:
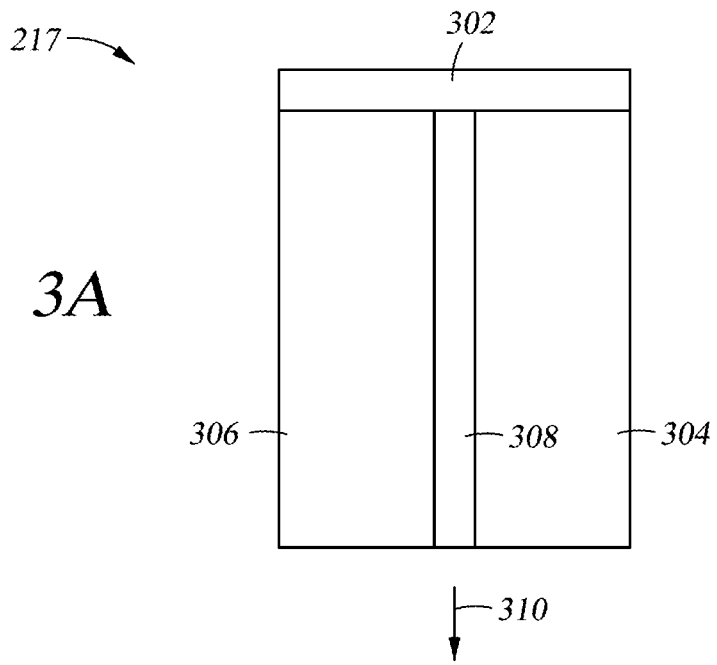
FIG. 3A illustrates a gain region according to one embodiment described herein.

A semiconductor laser diode gain region 217 may be protruded out of the surface 210. The semiconductor laser diode gain region 217 may be optically aligned with the reflector 212. A cross sectional view of the semiconductor laser diode gain region 217 is illustrated in FIG. 3A. As shown in FIG. 3A, the semiconductor laser diode gain region 217 includes a mirror 302, a p-doped layer 304, an n-doped layer 306 and a p-n junction 308. When an electrical current is applied to the semiconductor laser diode gain region 217, an optical light 310, such as a laser beam, is generated. The optical light 310 generated by the semiconductor laser diode gain region 217 may switch wavelengths, also known as mode hopping, which leads to significant power fluctuations. Referring back to FIG. 2, the reflector 212 embedded in the non-magnetic material 251 functions as a wavelength selective element that helps reducing the number of modes available for lasing.

Figure 3B:
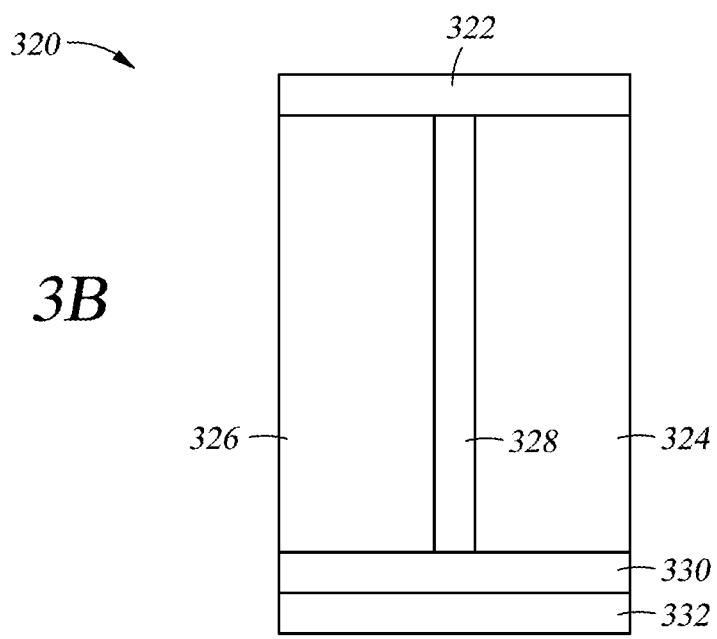
FIG. 3B illustrates a semiconductor laser diode having an antireflective coating according to one embodiment described herein.

Alternatively, the semiconductor laser diode gain region 217 may be replaced with a semiconductor laser diode having an antireflective (AR) coating. As shown in FIG. 3B, a semiconductor laser diode 320 includes a first mirror 322, a p-doped layer 324, an n-type layer 326, a p-n junction 328, a second mirror 330 and an AR coating 332. The semiconductor laser diode 320 may be disposed over the surface 210, forming a gap between the semiconductor laser diode 320 and the surface 210. The AR coating 332 may be facing the surface 210. The AR coating 332 may be made of $SiO_xN$. The AR coating 332 prevents the semiconductor laser diode 320 from generating a laser beam having a single mode. However, the reflector 212 as shown in FIG. 2 helps reducing the number of modes available for lasing.

As shown in FIG. 2, a near field transducer (NFT) 219—e.g., a plasmonic device or an optical transducer—is located at or proximate the MFS 208. The single mode optical light 310 coming out of the reflector 212 is focused on the NFT 219 by the SSC 218. The NFT 219 further focuses the optical light 310 to avoid heating neighboring tracks of data on the media 206—i.e., creates a beamspot much smaller than the diffraction limit. As shown by arrows 221, this optical energy emits from the NFT 219 to the surface of the media 206 below the MFS 208. The embodiments herein are not limited to any particular type of NFT and may operate with, for example, either a c-aperture, e-antenna, nanobeak, lollypop, split ring resonator, near-field source, or any other shaped transducer known in the art. The reflector 212, the SSC 218 and the NFT 219 may be fabricated at any location such that the NFT 219 passes over a portion of the spinning magnetic media 206 prior to that portion passing below the write pole 220a. Specifically, the reflector 212 may be located between shield S2 and return pole 220b, or between the write pole 220a and the outer face 231 of the HAMR system 200 (if the media 206 rotates opposite of the direction 223 shown).

While writing to the media 206, the RL 246 moves relative to the read/write heads 204, 202 in the direction shown by arrow 223. In HAMR, the optical energy 221 emitted from the NFT 219 temporarily lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than $H_c$. After a region of the RL 246 in the data track has been exposed to $H_w$ from the write pole 220a and the resulting heat from the optical energy 221 from the NFT 219, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 219 uses the optical energy 221 to heat the RL layer 246 and lower its magnetic coercivity.

Figure 4:
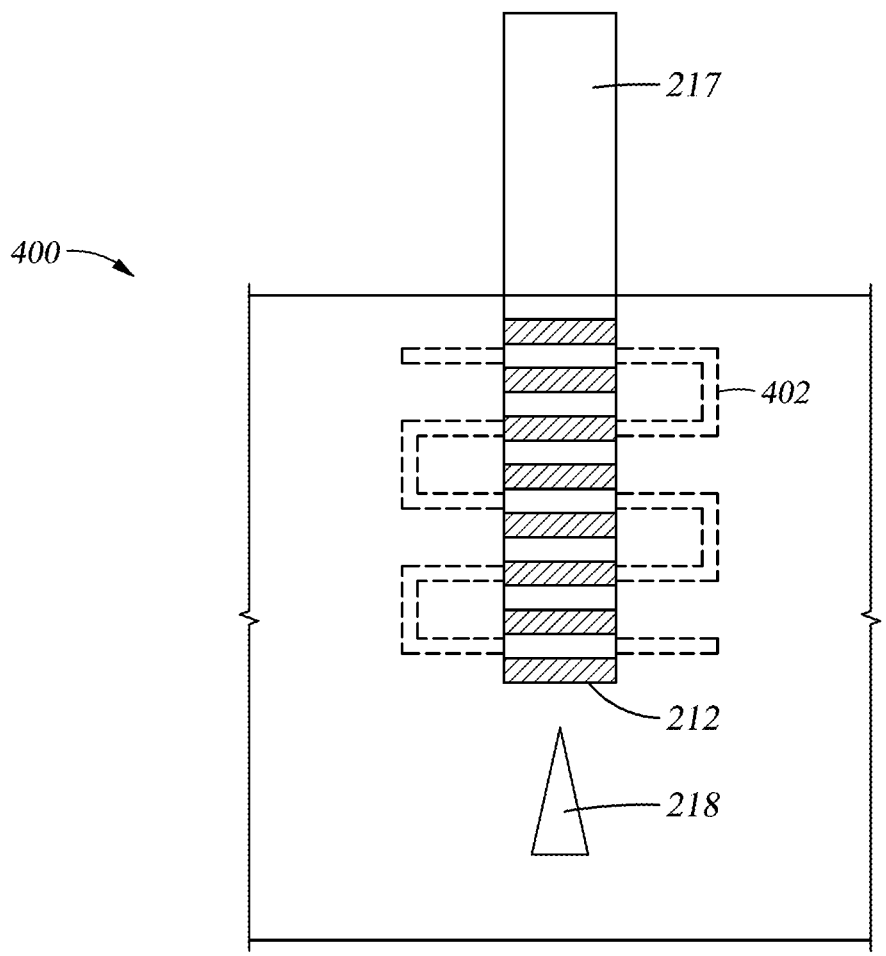
FIG. 4 illustrates a magnetic write head according to one embodiment described herein.
Figure 4:
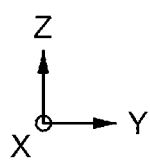

FIG. 4 illustrates a magnetic write head 400 according to one embodiment described herein. The magnetic write head 400 may be the magnetic write head 202 described in FIG. 2. For better clarity, components such as the write pole, the return pole and NFT and the magnetic yoke are omitted in FIG. 4. In order to further improve wavelength selectivity, a heating element 402 may be disposed proximate the reflector 212. The heating element 402 will raise the temperature of the wavelength selecting reflector 212, which changes the index of refraction of the various materials within the reflector 212. The resonant wavelength of the laser beam is highly dependent on the indices of refraction of the materials within the reflector 212. Therefore, the spectrum for the reflected light can be accurately controlled if the temperature of the reflector 212 is controlled. The heating element 402 may be a resistive heating element made of resistive metal alloy. The heating element 402 may have a serpentine shape, as shown in FIG. 4. The reflector 212 and the heating element 402 may be aligned in the down track direction (along the y-axis), or aligned in the cross track direction (along the x-axis), as shown in FIG. 4.

Figure 5:
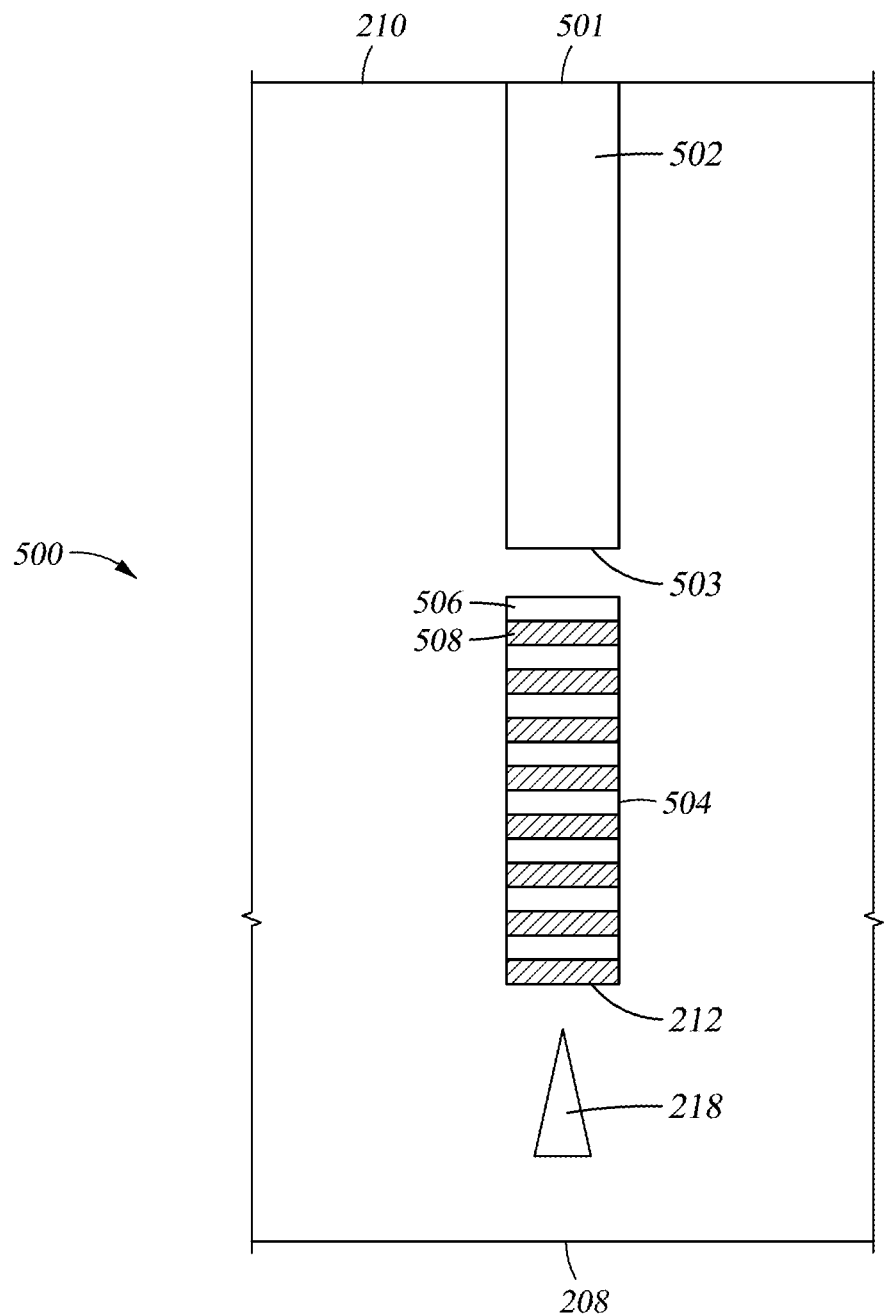
FIG. 5 illustrates a magnetic write head according to one embodiment described herein.

FIG. 5 illustrates a magnetic write head 500 according to one embodiment described herein. The magnetic write head 500 may be the magnetic write head 202 described in FIG. 2. For better clarity, components such as the write pole, the return pole and NFT and the magnetic yoke are omitted in FIG. 5. The magnetic write head 500 may include the MFS 208 and the surface 210 opposite the MFS 208. A semiconductor laser diode gain region 502 is disposed between the surface 210 and the MFS 208. The semiconductor laser diode gain region 502 can be transferred to the AlTiC substrate using epitaxial layer transfer, wafer bonding, or flip chip bonding. The semiconductor laser diode gain region 502 may be the same as the semiconductor laser diode gain region 217 shown in FIG. 3. The semiconductor laser diode gain region 502 has a first end 501 extending to the surface 210 and a second end 503 recessed from the surface 210 and towards the MFS 208. A reflector 504 is disposed proximate the second end 503 of the semiconductor laser diode gain region 502 and is aligned with the semiconductor laser diode gain region 502. The reflector 504 may be the same as the reflector 212 described in FIG. 2, except the reflector 504 does not extend to the surface 210. The reflector 504 may include alternating layers 506, 508, and the alternating layers 506, 508 may have different indices of refraction. The layers 506, 508 may be made of III-V semiconductor materials. The SSC 218 is disposed between the reflector 504 and the MFS 208.

Figure 6A:
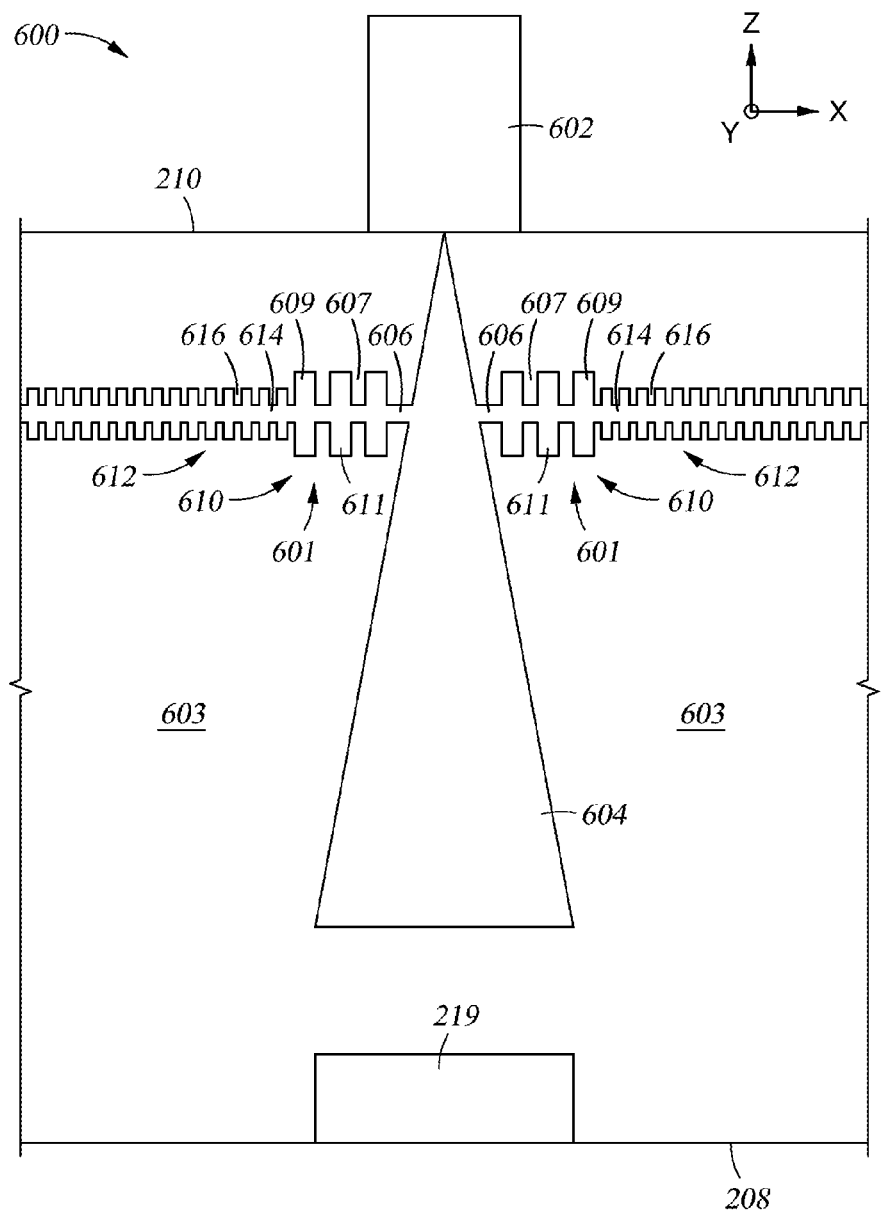
FIGS. 6A-6B illustrate magnetic write heads according to embodiments described herein.
Figure 6B:
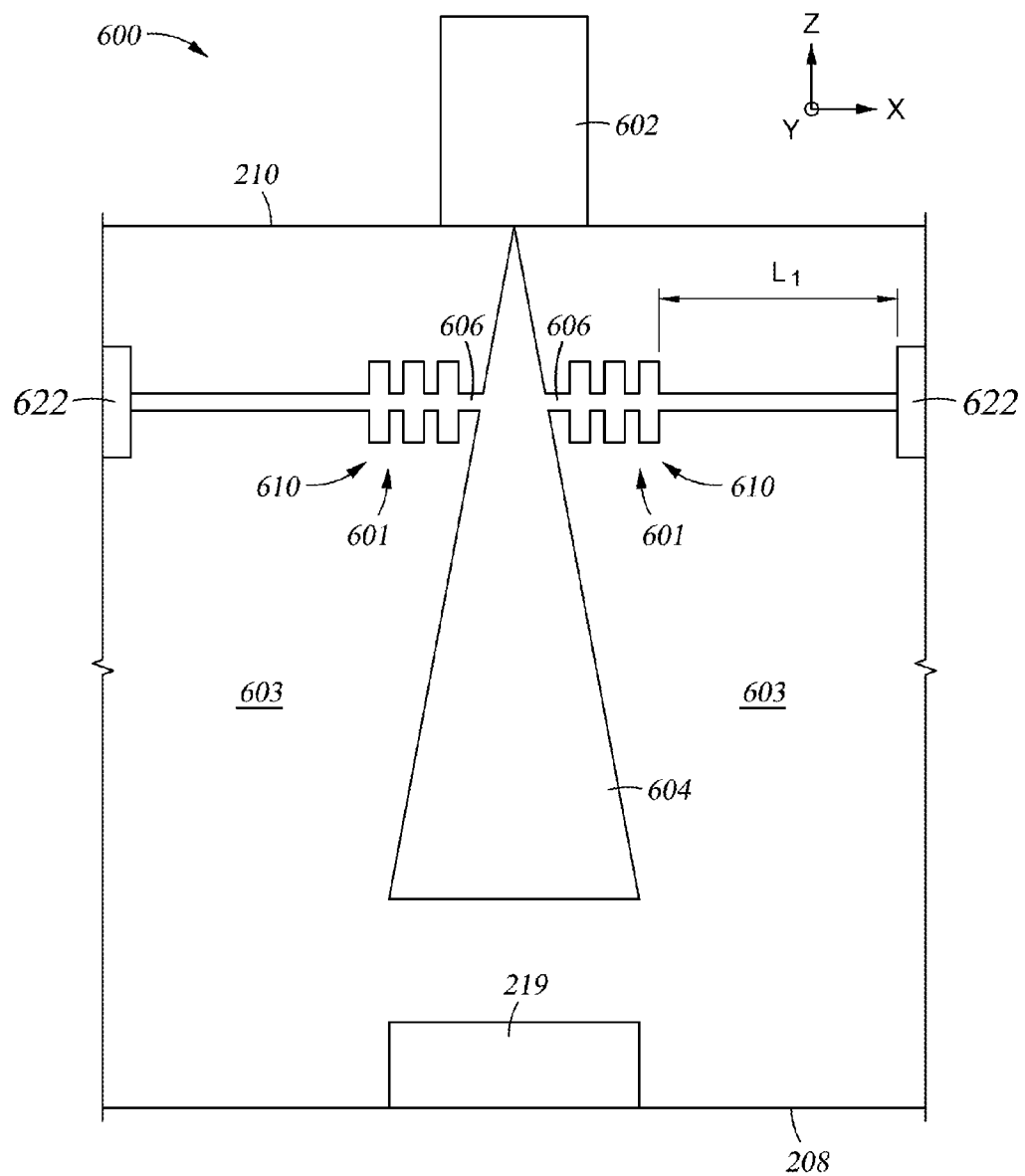

FIGS. 2-5 illustrate a HAMR system having a reflector embedded in the magnetic write head. The reflector is oriented parallel to the laser beam and suppresses the number of modes of the laser beam. Alternatively, a guided mode resonance structure constructed from grating coupler and a single mode waveguide having an optical axis parallel to the MFS (perpendicular to the laser beam) and is embedded in the magnetic write head may be utilized to suppress the number of modes of the laser beam. FIGS. 6A-6B illustrate such design. As shown in FIG. 6A, a magnetic write head 600 includes an optical light generating device 602 disposed over the surface 210. The optical light generating device 602 may be the semiconductor laser diode gain region 217 shown in FIG. 2, where the semiconductor laser diode gain region 217 may be in contact with the surface 210. Alternatively, the optical light generating device 602 may be the semiconductor laser diode 320 shown in FIG. 3B, where a gap may be formed between the semiconductor laser diode 320 and the surface 210. The optical light generating device 602 is optically aligned with a SSC 604, which also functioning as a waveguide for directing the optical light, such as a laser beam, to the NFT 219. The SSC 604 may be made of TaO and may be surrounded by a cladding material 603, such as SiO2 or Al$_2$O$_3$.

To generate a guided mode resonance structure 601, a grating coupler 610 may be used to couple the SSC 604 to a single mode planar waveguide 606. The single mode planar waveguide 606 may be made of TaO and the cladding 607 may be made of SiO2 or Al$_2$O$_3$. The single mode planar waveguide 606 may be disposed on both sides of the SSC 604 in a cross-track direction (X-direction). The grating coupler 610 may include a first plurality of protrusions 609 facing the surface 210 and a second plurality of protrusions 611 facing the MFS 208. Each protrusion 609 is aligned with a corresponding protrusion 611. The size of the grating coupler 610 should closely match the extent of the diverging laser beam to maximize the coupling efficiency. A reflector 612, such as a DBR, may be disposed at each end of the single mode planar waveguide 606. Each reflector 612 may include a comb structure 614 and cladding material 616. In one embodiment, the comb structure 614 is made of TaO and the cladding material 616 is made of SiO2 or Al$_2$O$_3$. The single mode planar waveguide 606 and the reflectors 612 may be extending in the cross-track direction and substantially parallel to the MFS 208, as shown in FIG. 6A.

During the guided mode resonance structure 601 operation, a laser beam is generated by the optical light generating device 602 and is coupled to the SSC 604. The laser beam, which may suffer from mode hopping, is coupled to the single mode planar waveguide 606 via the grating coupler 610 and travels in a direction that is substantially parallel to the MFS 208. The reflectors 612 reflect the laser beam backward towards the SSC 604, creating a resonant cavity supporting light oscillating in the direction transverse to the incident beam. Since the grating coupler and the single mode waveguide are highly wavelength selective, only a single well defined mode is supported by the guided mode resonance structure 601. The laser beam returned to the optical light generating device 602 from the guided mode resonance structure 601 has a very narrow linewidth on the order of 10 s of picometers. The effective laser cavity is thus formed by the laser diode cavity and the guided mode resonance structure. Such configuration results in a narrow bandwidth reflection filter for a broad spectral ranges. The bandwidth is determined by the quality factor of the resonator, i.e., the dimensions of the core region of the single mode planar waveguide 606. The reflectors 612 can be made significantly longer than 200 microns and can be as long as half of the slider spacing on the fabricated wafer. Also, the reflectance of the reflectors 612 can be enhanced to make highly reflective mirrors, creating a compact, high-Q cavity. As the laser beam is reflected back to the SSC 604 by the reflectors 612, the resulting laser beam traveling towards the NFT 219 via the SSC 604 will have a single mode.

In one embodiment, instead of using the reflectors 612 to reflect the laser beam back towards the SSC 604, the single mode planar waveguide 606 is extended to metal plates 622, as shown in FIG. 6B. The metal plate 622 may be made of silver. The length "L1" of a portion of the single mode planar waveguide 606 (the distance between the metal plate 622 and the grating coupler 610) may be between about 200 microns and about 400 microns. The laser beam is coupled to the single mode planar waveguide 606 via the grating coupler 610 and is reflected back to the SSC 604 by the metal plate 622. Again the resulting laser beam traveling towards the NFT 219 via the SSC 604 also will have a single mode.

In summary, a HAMR system is disclosed. The HAMR system includes a magnetic write head having a MFS and a surface opposite the MFS. A reflector is disposed between the MFS and the surface opposite the MFS and a semiconductor laser diode gain region is protruding out of the surface opposite the MFS. The reflector suppresses the number of modes of optical light generated in the semiconductor laser diode gain region and functions as a wavelength selective element. Having a single mode optical light helps reducing power fluctuation of the power used to generate the optical light.

While the foregoing is directed to embodiments of the present invention, other and further embodiments of the invention may be devised without departing from the basic scope thereof, and the scope thereof is determined by the claims that follow.

What is claimed is:

1. A magnetic write head, comprising:
   a media facing surface;
   a surface opposite the media facing surface;
   a semiconductor laser diode gain region protruding out of the surface opposite the media facing surface; and
   a reflector extending from the surface opposite the media facing surface toward the media facing surface, wherein the semiconductor laser diode gain region is aligned with the reflector, wherein the reflector is disposed between the media facing surface and the surface opposite the media facing surface; and
   a spot size converter spaced from the reflector and disposed between the media facing surface and the reflector.

2. The magnetic write head of claim 1, further comprising a near field transducer disposed between the media facing surface and the spot size converter.

3. The magnetic write head of claim 1, wherein the reflector includes alternating layers of different material forming a spatial periodic structure.

4. The magnetic write head of claim 3, wherein the alternating layers have different indices of refraction.

5. The magnetic write head of claim 1, wherein the reflector is a distributed Bragg reflector.

6. The magnetic write head of claim 1, further includes a heating element disposed proximate the reflector.

7. The magnetic write head of claim 6, wherein the heating element and the reflector are aligned in a cross track direction.

8. The magnetic write head of claim 6, wherein the heating element has a serpentine shape.

* * * * *